US012600525B2

(12) United States Patent
Lau et al.

(10) Patent No.: US 12,600,525 B2
(45) Date of Patent: Apr. 14, 2026

(54) STRUCTURE FOR LOCKING AND RELEASING SHEET-LIKE OBJECT AND PACKAGING STORAGE CONTAINER

(71) Applicant: FINEST PRODUCTS LIMITED., Chaiwan (CN)

(72) Inventors: Kwok Din Lau, Chaiwan (CN); Kwan Ming Jimmy Lau, Chaiwan (CN)

(73) Assignee: FINEST PRODUCTS LIMITED., Chaiwan (CN)

( * ) Notice: Subject to any disclaimer, the term of this patent is extended or adjusted under 35 U.S.C. 154(b) by 0 days.

(21) Appl. No.: 18/393,852

(22) Filed: Dec. 22, 2023

(65) Prior Publication Data

US 2024/0317460 A1     Sep. 26, 2024

(30) Foreign Application Priority Data

Mar. 22, 2023     (CN) .......................... 202310285016.0

(51) Int. Cl.
*B65D 25/10*          (2006.01)
*B65D 85/00*          (2006.01)
*G11B 33/04*          (2006.01)
(52) U.S. Cl.
CPC ......... *B65D 25/106* (2013.01); *B65D 85/544* (2013.01); *G11B 33/0427* (2013.01); *B65D 2585/54* (2013.01)
(58) Field of Classification Search
CPC .... B65D 25/106; B65D 85/544; B65D 85/54; G11B 33/0427

(Continued)

(56) References Cited

U.S. PATENT DOCUMENTS 5,251,750 A * 10/1993 Gelardi ................. G11B 23/00
5,526,926 A     6/1996 Deja
(Continued)

FOREIGN PATENT DOCUMENTS

CN          1293812 A      5/2001
CN          2447910 Y      9/2001
(Continued)

OTHER PUBLICATIONS

The first Office Action issued on Aug. 28, 2024 for the counterpart Chinese Patent Application No. 202310285016.0.
(Continued)

*Primary Examiner* — Rafael A Ortiz
(74) *Attorney, Agent, or Firm* — Yue (Robert) Xu; Apex Attorneys at Law, LLP

(57)          ABSTRACT

A structure for locking and releasing a sheet-like object and a packaging storage container are provided according to the present application. The structure includes: an accommodating portion and a pressing member assembly. The pressing member assembly is arranged at the center of the accommodating portion, and protrudes upward from the bottom of the accommodating portion to pass through a central hole of the object and fix the object in the accommodating portion. The pressing member assembly includes: multiple snap fasteners for fixing the object; multiple push sheets for pushing the object; a pressing member body; and a pressing sheet; wherein the pressing sheet is formed at the top center of the pressing member assembly and is in a flat-plate shape for a user to press downward. The snap fasteners and the push sheets are respectively flexibly connected with the pressing member body and the pressing sheet.

5 Claims, 10 Drawing Sheets

(58) Field of Classification Search
USPC ........................................................ 206/308.1
See application file for complete search history.

(56) References Cited

U.S. PATENT DOCUMENTS

| | | | | |
|---|---|---|---|---|
| 6,041,923 A * | 3/2000 | Furutsu | .............. | G11B 33/0427 |
| 6,196,384 B1 * | 3/2001 | Belden, Jr. | ......... | G11B 33/0427 |
| | | | | 206/308.1 |
| 6,427,833 B1 * | 8/2002 | Hui | .................... | G11B 33/0427 |
| 6,547,067 B1 | 4/2003 | Liu | | |
| 6,611,490 B1 | 8/2003 | Bierhoff | | |
| 6,732,862 B1 * | 5/2004 | Hu | .................... | G11B 33/0427 |
| 6,983,842 B2 * | 1/2006 | Krummenacher | .......................... | |
| | | | | G11B 33/0427 |
| 7,398,878 B2 * | 7/2008 | Kondo | ................... | G11B 33/04 |
| | | | | 206/308.1 |
| 7,669,712 B2 * | 3/2010 | Lammerant | ........ | G11B 33/0427 |
| | | | | 206/308.1 |
| 2001/0000599 A1 | 5/2001 | Belden | | |
| 2004/0007482 A1 * | 1/2004 | Wen-Long | ......... | G11B 33/0427 |
| 2004/0020802 A1 * | 2/2004 | Chang | ............... | G11B 33/0427 |
| 2004/0079657 A1 * | 4/2004 | Yau | .................... | G11B 33/0427 |
| 2004/0163976 A1 * | 8/2004 | Krummenacher | .......................... | |
| | | | | G11B 33/0427 |
| 2004/0261090 A1 | 12/2004 | Kondo | | |
| 2005/0092627 A1 * | 5/2005 | Hu | .................... | G11B 33/0427 |
| 2005/0115847 A1 * | 6/2005 | Wawrzynowski | .......................... | |
| | | | | G11B 33/0427 |
| 2005/0279656 A1 * | 12/2005 | Fa | ...................... | G11B 33/0427 |
| 2006/0021885 A1 * | 2/2006 | Wawrzynowski | .......................... | |
| | | | | G11B 33/0427 |
| 2007/0029216 A1 * | 2/2007 | Liu | ................... | G11B 33/0427 |
| 2008/0006546 A1 * | 1/2008 | Lau | ................... | G11B 33/0427 |
| 2010/0155275 A1 * | 6/2010 | Freitag | ................ | G11B 33/045 |
| | | | | 206/308.1 |

FOREIGN PATENT DOCUMENTS

| | | | | | |
|---|---|---|---|---|---|
| DE | 3425579 | A1 | 1/1986 | | |
| GB | 2340481 | A | 2/2000 | | |
| GB | 2347167 | A | 8/2000 | | |
| JP | S63157852 | A | 6/1988 | | |
| JP | H07125785 | A | 5/1995 | | |
| JP | H10139084 | A | 5/1998 | | |
| JP | 2000043969 | A | 2/2000 | | |
| JP | 2001048276 | A | 2/2001 | | |
| JP | 3080802 | U | 10/2001 | | |
| JP | 2002205786 | A | 7/2002 | | |
| JP | 2003118786 | A | 4/2003 | | |
| JP | 2003221085 | A | 8/2003 | | |
| JP | 2005029260 | A | 2/2005 | | |
| TW | M375271 | * | 3/2010 | | |
| TW | M375271 | U | 3/2010 | | |
| WO | WO-2006086903 | A1 * | 8/2006 | ......... | G11B 33/0427 |

OTHER PUBLICATIONS

The first Office Action issued on Aug. 6, 2024 for the counterpart Japanese Application No. 2023-186528.

Japanese Second Office Action issued on Jan. 21, 2025 for the Japanese counterpart application No. 2023-186528.

Chinese Second Office Action issued on Feb. 27, 2025 for the Chinese priority application No. 202310285016.0.

Chinese third Office Action issued on Aug. 8, 2025 for Chinese priority application No. 202310285016.0.

Japanese third Office Action issued on Jul. 15, 2025 for Japanese counterpart application No. 2023-186528.

* cited by examiner

32

31

A

A

B

B

3111

200

C                                                                    C

V3                                                              V2

200

321

200

ΔH

STRUCTURE FOR LOCKING AND RELEASING SHEET-LIKE OBJECT AND PACKAGING STORAGE CONTAINER

CROSS REFERENCE OF RELATED APPLICATION

The present disclosure claims priority to Chinese Patent Application No. 202310285016.0, titled "STRUCTURE FOR LOCKING AND RELEASING SHEET-LIKE OBJECT AND PACKAGING STORAGE CONTAINER", filed on Mar. 22, 2023 with the China National Intellectual Property Administration, which is incorporated herein by reference in its entirety.

FIELD

The present disclosure relates to the technical field of object storage, and in particular to a structure for locking and releasing a sheet-like object and a packaging storage container.

BACKGROUND

Generally, a packaging storage container is used by users to accommodate sheet-like objects, such as a star card, a stamp, a multimedia storage disk, or a data storage card. In the conventional technology, the packaging storage container is generally made of a hard material (such as plastic, polypropylene polymer PE). On one hand, such material is relatively sturdy and can protect the accommodated objects from being damaged. On the other hand, the packaging storage container is lightweight and easy to carry. In addition, the packaging storage container is transparent by using the above material, thereby improving use experience.

In addition, in such packaging storage container in the conventional technology, a pressing member is generally provided at the center of an accommodating portion for accommodating objects. The pressing member protrudes form the bottom of the accommodating portion and is deformable slightly. For example, the pressing member can pass through a central hole of the object, such as an optical disc, and is flexibly deformed so as to hold the object, thereby fixing the object in the accommodating portion. When the object is to be taken out, the pressing member is applied with external force so as be deformed, and thus the pressing member release the object, and the object can be taken out from the accommodating portion.

However, due to the insufficient deformation of the pressing member of the packaging storage container in the conventional technology, the user needs to exert a large force when putting the object into the accommodating portion or taking out the object from the accommodating portion, which is inconvenient for user. Moreover, as the applied force is large, it is easy to cause damage to the object or the pressing member assembly.

SUMMARY

An object according to the present disclosure is to provide a structure for locking and releasing a sheet-like object and a packaging storage container having the same, so that a user does not need to exert a large force when put in or taking out the object, and thus the object or the pressing member assembly cannot be damaged.

In view of this, a structure for locking and releasing a sheet-like object is provided according to the present application, which includes:

an accommodating portion, for accommodating the object; and a pressing member assembly, arranged at the center of the accommodating portion, and protruding upward from the bottom of the accommodating portion to pass through a central hole of the object and hold the object in the accommodating portion, the pressing member assembly includes: multiple snap fasteners for fixing the object; multiple push sheets for pushing the object; a pressing member body; and a pressing sheet; the pressing sheet is formed at the top center of the pressing member assembly and is in a flat-plate shape for a user to press downward; the snap fasteners and the push sheets are respectively flexibly connected with the pressing member body and the pressing sheet, so that the snap fasteners and the push sheets are rotatable when the pressing sheet is moved up and down.

According to an embodiment of the present application, the snap fasteners and the push sheets extend radially between the pressing member body and the pressing sheet, a radial distal end of each snap fastener is flexibly connected to the pressing member body or is integrally formed with the pressing member body, and a radial proximal end of each snap fastener is connected to the pressing sheet; a radial proximal end of each push sheet is connected to the pressing sheet.

According to an embodiment of the present application, each snap fastener includes: a snap tooth, a first connecting portion and a second connecting portion; the snap tooth is vertically arranged and is provided with a hook member which protrudes outward radially, the snap tooth is flexibly connected with the pressing member body and the pressing sheet through the first connecting portion and the second connecting portion, and the snap tooth is rotatable relative to the first connecting portion and the second connecting portion at flexible connections with the first connecting portion and the second connecting portion, and the second connecting portion is rotatable relative to the pressing sheet at a flexible connection with the pressing sheet, the hook members is arranged in a horizontal direction in a case that the pressing sheet is not pressed, and a maximum radial distance among the hook members in the horizontal direction formed at the top of the pressing member assembly is greater than a diameter of the central hole of the object.

According to an embodiment of the present application, in a case that the pressing sheet moves downward toward the bottom of the accommodating portion under a downward force, the pressing sheet rotates relative to the second connecting portion at the flexible connection with the second connecting portion to further drive the second connecting portion to move downward, so that the second connecting portion rotates relative to the snap tooth at the flexible connection with the snap tooth to pull the snap tooth downward, the snap tooth rotates relative to the first connecting portion at the flexible connection with the first connecting portion, the hook members of the snap teeth rotate upward, and the maximum radial distance of the hook members in the horizontal direction formed at the top of the pressing member assembly is reduced to be less than the diameter of the central hole of the object;

the hook members are restored to initial horizontal positions in a case that the downward force on the pressing sheet is released, and the maximum radial distance of the hook members in the horizontal direction formed at the top of the pressing member assembly is restored to be greater than the diameter of the central hole of the object.

According to an embodiment of the present application, each push sheet includes: an upper push portion, a support and an push sheet connecting portion, the upper push portion is horizontally arranged and is lower than a horizontal position of the pressing sheet, a radial distal end of the upper push portion is an upper push portion free end and protrudes upward for pushing the object upward; the support is substantially vertically arranged, and a lower portion of the support is flexibly connected to a radial proximal end of the upper push portion, a lowest end of the support is arranged to abut against an upper surface of the accommodating portion, an uppermost end of the support is flexibly connected to one end of the push sheet connecting portion, and another end of the push sheet connecting portion is flexibly connected to the pressing sheet, a maximum radial distance between the upper push portion free ends in the horizontal direction formed is greater than the diameter of the central hole of the object, horizontal positions of the upper push portion free ends are arranged to be lower than the horizontal positions of the hook members in case of no force applying, and a vertical height difference between the upper push portion free ends and the hook members is at least equal to a thickness of the object.

According to an embodiment of the present application, in a case that the pressing sheet moves downward toward the bottom of the accommodating portion under a downward force, the pressing sheet rotates relative to the push sheet connecting portion at a flexible connection with the push sheet connecting portion to further drive the push sheet connecting portion to move downward, and the lowest end of the support abuts against the upper surface of the accommodating portion, so that the upper push portion free end pivots upward around the lowest end of the support; the pressing sheet moves upward to be restored to the initial horizontal position in a case that the downward force on the pressing sheet is released, so that the upper push portion free end pivots downward around the lowest end of the support to be restored to the initial horizontal position.

According to an embodiment of the present application, the pressing member assembly can be made of the following materials: ABS; polystyrene ethylene; polycarbonate; PP; and PE.

According to an embodiment of the present application, the pressing member body is fixedly connected to the accommodating portion or is integrally formed with the accommodating portion.

According to an embodiment of the present application, multiple edge recesses are spaced apart at equal circumferential angles at a circumferential edge of the accommodating portion for the object to be taken out from the accommodating portion.

A packaging storage container, for accommodating a sheet-like object, which includes:

a container body, with a thickness; the structure for locking and releasing the sheet-like object; and a cover body, pivotally connected to the container body on one side of the container body to close or uncover the accommodating portion, the accommodating portion is circular and arranged at the center of the container body, and is recessed from one side surface of the container body along a thickness direction of the container body.

Compared with the conventional technology, the structure for locking and releasing the sheet-like object and the packaging storage container having the same according to the embodiments of the present disclosure can obtain the following technical effects:

1, when the object is placed in the accommodating portion, after the pressing sheet is pressed, the hook members of the pressing member assembly for holding are rotated upward, so that the radial distance above the pressing member assembly is less than the diameter of the central hole of the object, the object is placed in the accommodating portion without being hindered, and the object may not be damaged by the collision of the packaging storage container during placement. At the same time, the hook members are automatically restored to the horizontal state after the pressing sheet is released, thereby firmly holding the object.

2, when the object is taken out from the accommodating portion, the hook members of the pressing member assembly rotate upward under force, so that the radial distance above the pressing member assembly is less than the diameter of the central hole of the object, and the object can be easily taken out without being damaged by the collision of the packaging storage container. In addition, the pressing member assembly according to the present disclosure is further provided with the push sheets, which can generate a lever effect to change the downward force of pressing the pressing sheet into the force of pushing the object upward, so that the user can easily and effortlessly take the object out from the accommodating portion.

3, the pressing member assembly according to the present disclosure is integrally formed with a simple structure and a small space occupation, and the user can put in and take out the object only by pressing the pressing sheet, so that the operation is simpler.

4, during pressing, the snap fasteners according to the present disclosure are prevented from directly contacting the object, so that the object can be prevented from being damaged.

BRIEF DESCRIPTION OF THE DRAWINGS

In order to illustrate the technical solutions in the embodiments of the present disclosure or in conventional technology clearer, the drawings referred to for describing the embodiments or the conventional technology will be briefly described below. Apparently, the drawings in the following description show only some embodiments of the present application, and those skilled in the art can obtain other drawings according to the drawings without any creative work.

Figure 1A:
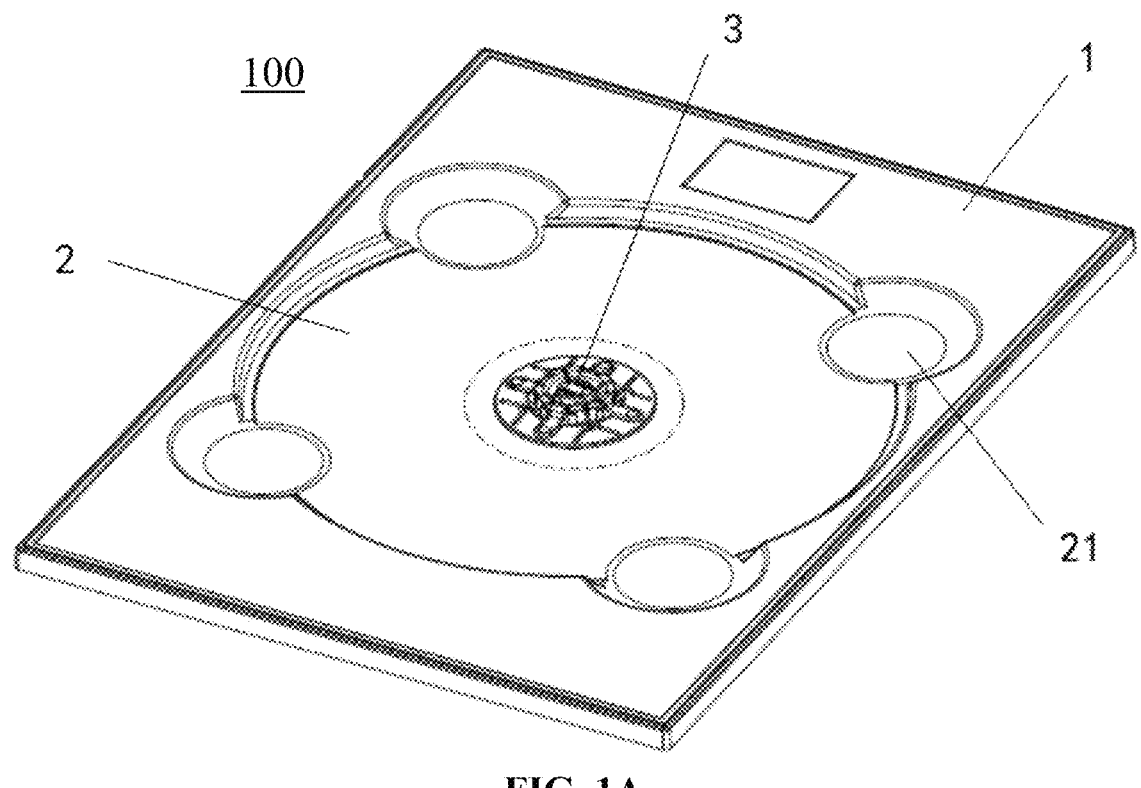
FIG. 1A is a schematic perspective view of a packaging storage container according to embodiments of the present application.
Figure 1B:
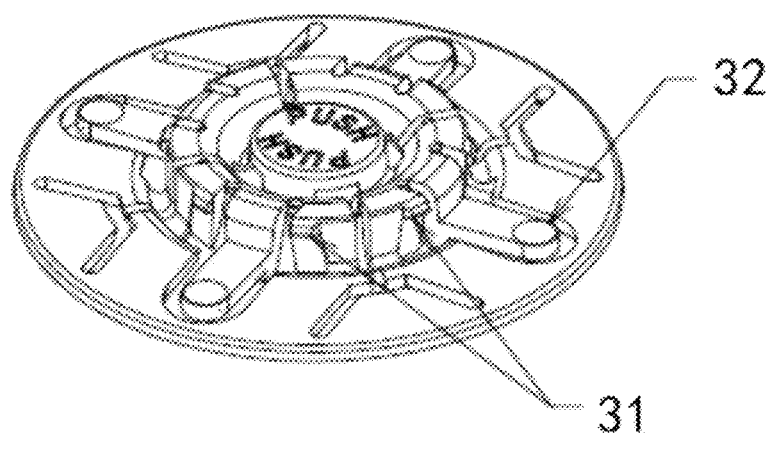
FIG. 1B is a schematic perspective view of a structure for locking and releasing a sheet-like object according to embodiments of the present application.
Figure 1C:
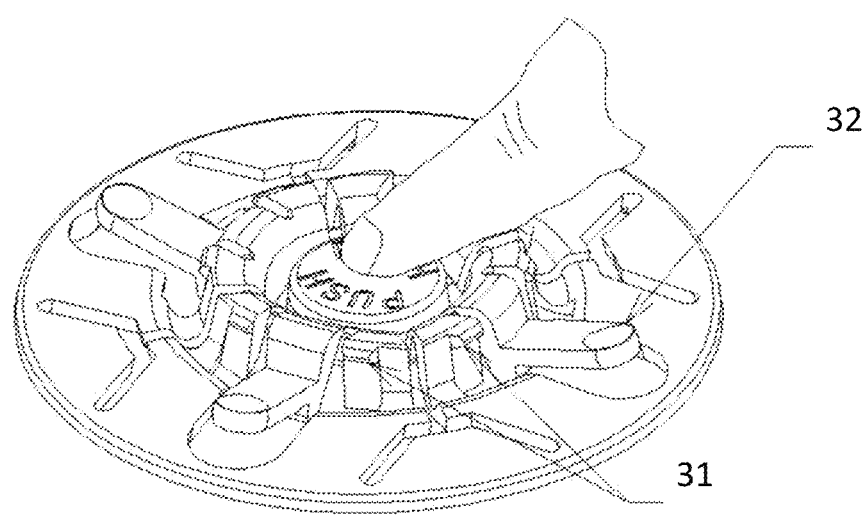
FIG. 1C is a schematic view showing the structure for locking and releasing the sheet-like object in use according to embodiments of the present application.

Reference numerals in the drawings are as follows:

| 1 | container body; | 2 | accommodating portion; |
|---|---|---|---|
| 21 | edge recess; | 3 | pressing member assembly; |

-continued

| 31 | snap fastener; | 311 | snap tooth; |
|---|---|---|---|
| 3111 | hook member; | 312 | first connecting portion; |
| 313 | second connecting portion; | 32 | push sheet; |
| 321 | upper push portion; | 3211 | top upper portion free end; |
| 322 | support; | 323 | push sheet connecting portion; |
| 33 | pressing member body; | 34 | pressing sheet; |
| 100 | packaging storage container; | 200 | object. |

DETAILED DESCRIPTION OF THE EMBODIMENTS

Hereinafter the technical solutions according to the embodiments of the present disclosure are described clearly and comprehensively in conjunction with the drawings in the embodiments of the present application. It is apparent that the described embodiments are only a part of the embodiments according to the present application, rather than all the embodiments. All other embodiments obtained based on the embodiments of the present disclosure by those skilled in the art without any creative efforts fall within the protection scope of the present application.

Otherwise clear specification and definition are provided, terms such as "installation", "joint" and "connection" should be understood in a broad sense, such as a fixed connection, a detachable connection or an integral connection; a mechanical connection or an electrical connection, a direct connection or an indirect connection through an intermediate media, or an internal connection inside two components. For those skilled in the art, the specific meaning of the above terms in the present disclosure may be understood in the light of specific circumstances.

Referring to FIG. 1A to 1C, FIG. 2A and FIG. 3A, a packaging storage container 100 is provided according to the present application, which can accommodate a sheet-like object 200. The object may be a star card, a stamp, a multimedia storage disk, or a data storage card. The packaging storage container 100 includes a container body 1 and a structure for locking and releasing a sheet-like object. The container body 1 has a certain thickness and is a main body portion of the packaging storage container 100. The structure for locking and releasing the sheet-like object includes an accommodating portion 2 and a pressing member assembly 3. The accommodating portion 2 is substantially circular, arranged at the center of the container body 1, and is recessed from one side surface of the container body 1 to form a space for accommodating the object 200. Moreover, one or more edge recesses 21 are spaced apart at equal circumferential angles at a circumferential edge of the accommodating portion 2, which is convenient for a user to take out the object 200 from the accommodating portion 2. In the present application, in the center of the accommodating portion 2, four edge recesses 21 are spaced apart at 90 degrees along the circumferential edge of the accommodating portion 2. Certainly, the number of the edge recesses 21 is not limited herein. In addition, a shape of the accommodating portion 2 may be determined according to a shape of the object, for example, may be square, rectangular or polygonal, which is not limited herein. In addition, the packaging storage container 100 according to the present disclosure is further provided with a cover body, which is pivotally connected to the container body 1 on one side of the container body 1, so as to be able to close or uncover the accommodating portion 2.

Referring to FIGS. 1B, 1C, 2A to 2C, 3A to 3E, and 4A to 4H, the pressing member assembly 3 is arranged at the center of the accommodating portion 2, and is in shape of circular as whole and protrudes from the bottom of the accommodating portion 2, so as to be able to pass through a central hole of the object 200, and fix and hold the object 200 in the accommodating portion 2. Specifically, the pressing member assembly 3 includes: snap fasteners 31, push sheets 32, a pressing member body 33 and a pressing sheet 34.

According to the present application, the pressing member assembly 3 is made of polymer material. Preferably, the pressing member assembly 3 is made of the following material: Acrylonitrile Butadiene Styrene (ABS), General Purpose Polystyrene (GPPS), Polycarbonate (PC), Polypropylene (PP), and Poly Ethylen (PE).

Figure 2A:
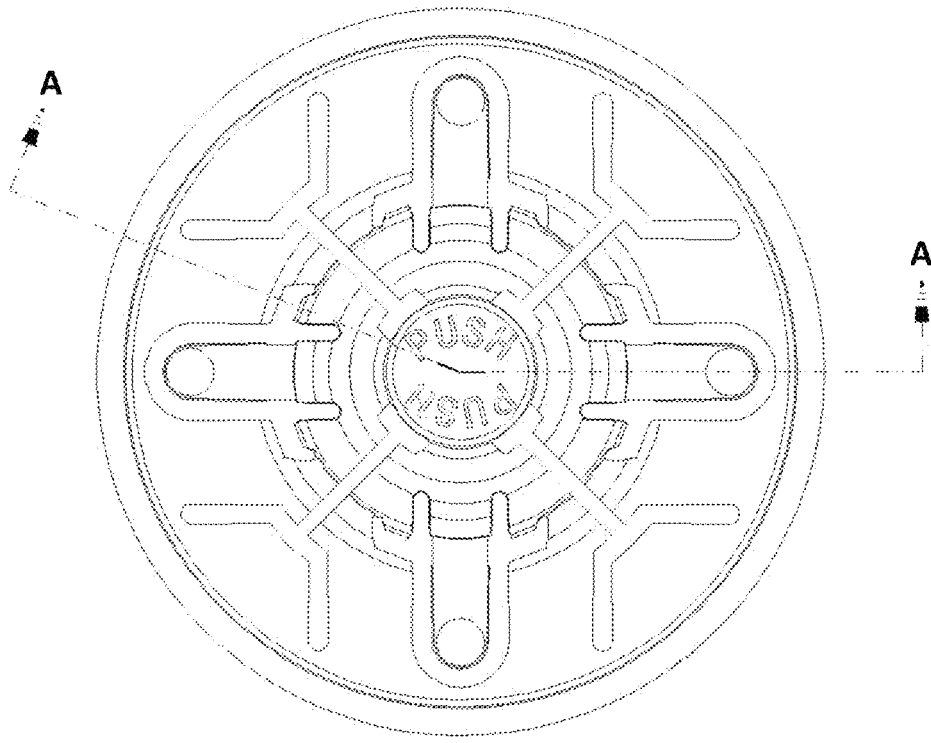
FIG. 2A is a schematic top view of the structure for locking and releasing the sheet-like object according to embodiments of the present application.
Figure 2B:
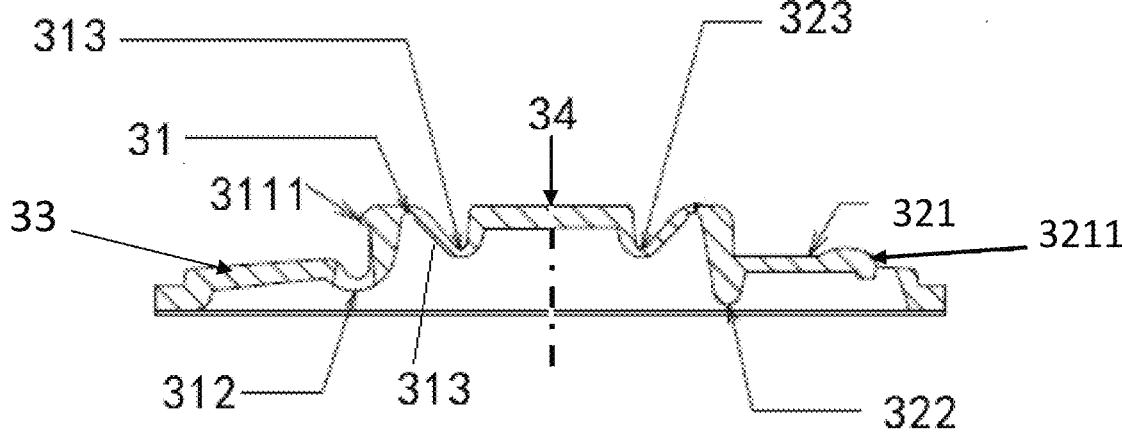
FIG. 2B is a cross-sectional view of the structure for locking and releasing the sheet-like object along line A-A in FIG. 2A according to embodiments of the present application, in which the pressing member assembly is in an un-pressed state.
Figure 3A:
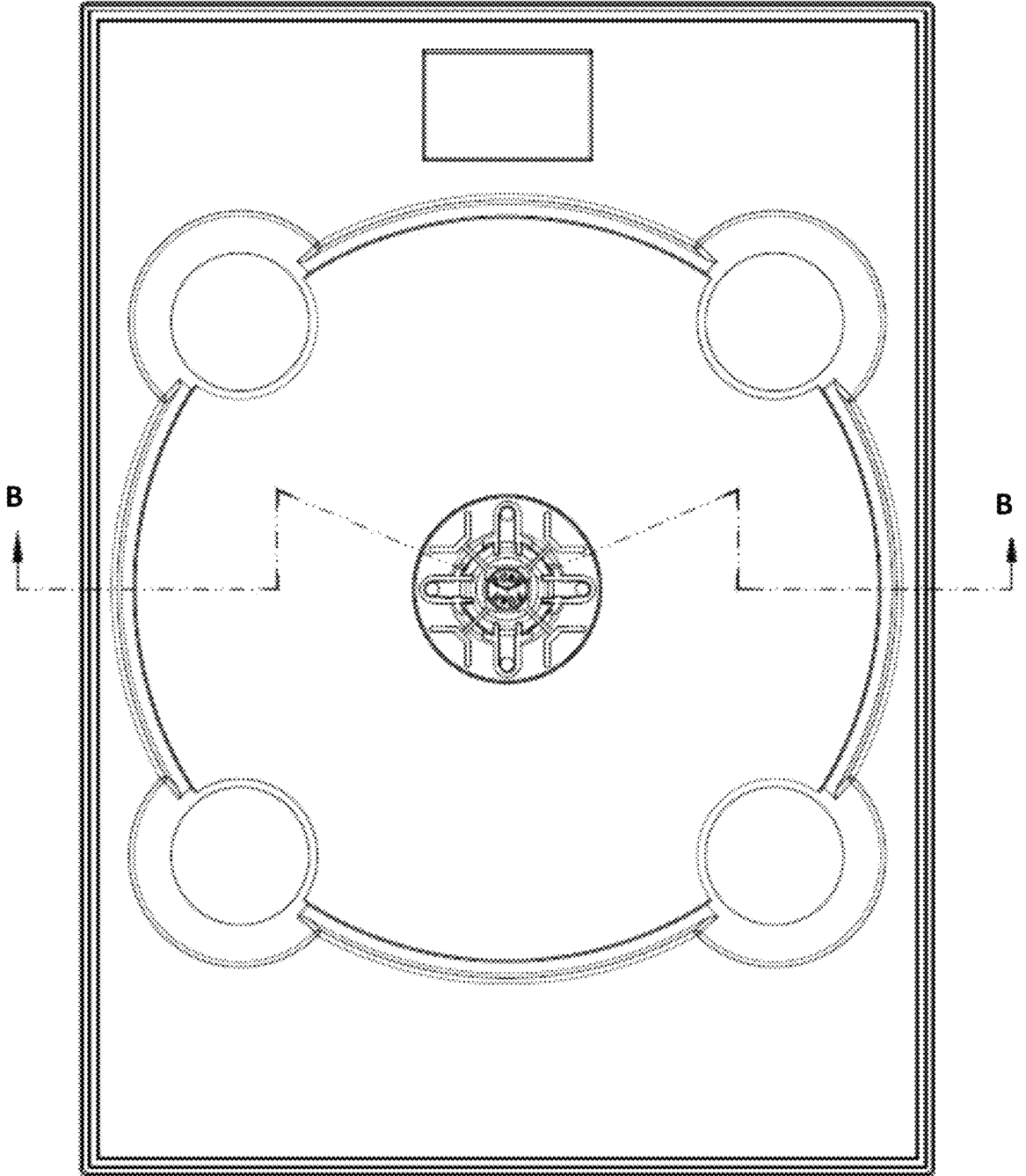
FIG. 3A is a schematic top view of the packaging storage container according to embodiments of the present application, in which the object is accommodated in an accommodating portion of the packaging storage container.
Figure 3B:
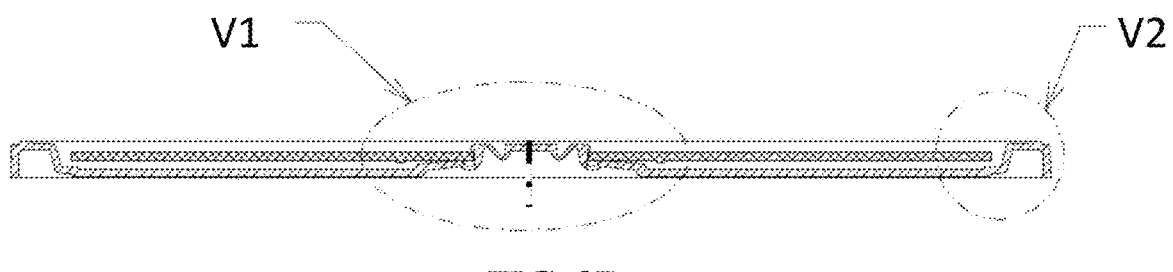
FIG. 3B is a cross-sectional view of the packaging storage container along line B-B in FIG. 3A according to embodiments of the present application.
Figures 4A, 4B:
FIG. 4A is a schematic top view of the packaging storage container according to embodiments of the present application, and the object is accommodated in an accommodating portion of the packaging storage container.
FIG. 4B is a cross-sectional view of the packaging storage container along line C-C in FIG. 3A according to embodiments of the present application.
Figure 4C:
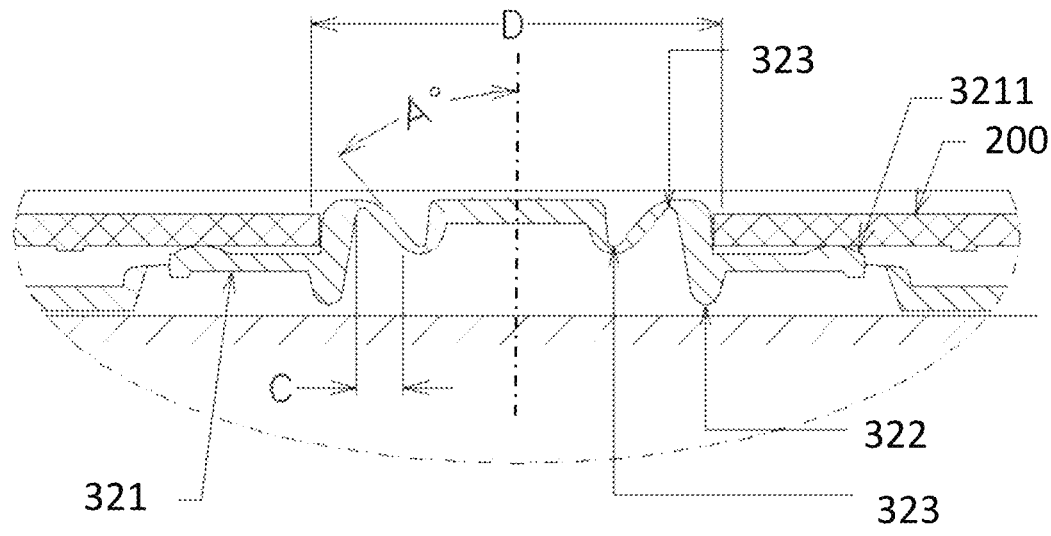
FIG. 4C is an enlarged view of portion V3 in FIG. 4B, which shows the state when the structure for locking and releasing the sheet-like object is not pressed according to embodiments of the present application.

Specifically, referring to FIGS. 2A, 3A and 4A, multiple snap fasteners 31 and multiple push sheets 32 are spaced apart at equal circumferential angles along a circumferential direction of the pressing member assembly 3, the multiple snap fasteners 31 and the multiple push sheets 32 are symmetrically arranged along the circumferential direction of the pressing member assembly 3 with gaps between each other along the circumferential direction, so as to be able to be relatively rotatable. The pressing member body 33 is fixedly connected to the accommodating portion 2 or is integrally formed with the accommodating portion 2, and the pressing sheet 34 is formed at the top center of the pressing member assembly 3 and is in a flat-plate shape for user to press downward.

Referring to FIGS. 2B to 2C, 3B to 3E, and 4B to 4H, the snap fasteners 31 and the push sheets 32 extend radially between the pressing sheet 34 and the pressing member body 33, and both of which have a circumferential width. A radial distal end of each snap fastener 31 is flexibly connected to the pressing member body 33 or is integrally formed with and the pressing member body 33, and a radial proximal end of each snap fastener 31 is flexibly connected to the pressing sheet. A radial proximal end of each push sheet 32 is flexibly connected to the pressing sheet 34, and a radial distal end of each push sheet 32 is a free end and is movable relative to the pressing member body 33.

Herein, the term "flexibly connect" refers to that two elements are connected through a flexible material with elasticity, and the two elements can rotate relative to each other under force and can be restored to initial states with their own elasticity when the force is removed.

According to the embodiment of the present application, special referring to FIGS. 2B to 2C and 3B to 3E, the snap fastener 31 includes: a snap tooth 311, a first connecting portion 312 and a second connecting portion 313. The snap tooth 311 is vertically arranged and is provided with a hook member 3111 that protrudes outward radially, and the snap tooth 311 is flexibly connected with the pressing member body 33 and the pressing sheet 34 through the first connecting portion 312 and the second connecting portion 313, respectively. Specifically, the snap tooth 311 is rotatable relative to the first connecting portion 312 and the second connecting portion 313 at flexible connections with the first connecting portion 312 and the second connecting portion 313, respectively, and the second connecting portion 313 is rotatable relative to the pressing sheet 34 at a flexible connection with the pressing sheet 34.

Figure 3C:
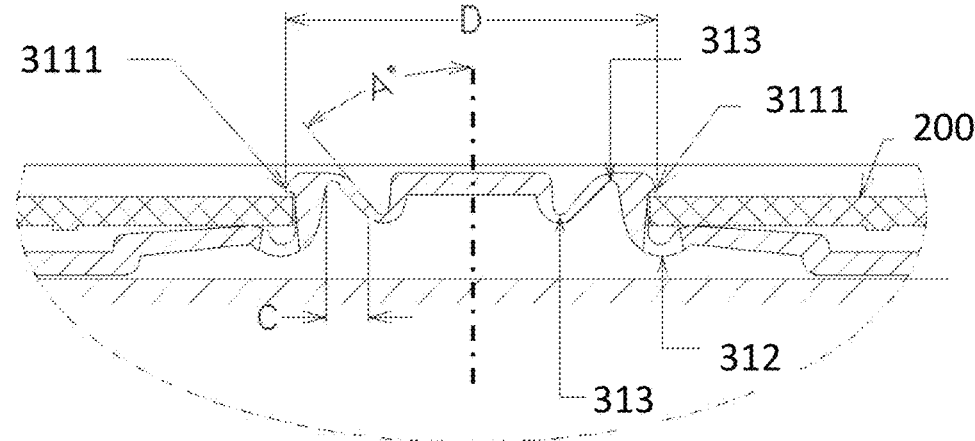
FIG. 3C is an enlarged view of portion V1 in FIG. 3B, which shows the state that the structure for locking and releasing the sheet-like object is not pressed according to embodiments of the present application.

As shown in FIG. 3C, in a case that the pressing sheet 34 is not pressed, an inclination angle A° (the angle A° ranges from 30 degrees to 90 degrees) is formed between the second connecting portion 313 and the pressing sheet 34, and a projection length of the second connecting portion 313 on the horizontal plane is C. In addition, the snap teeth 311 are arranged so that the hook members 3111 remain horizontal, and in that case, a maximum radial distance D among the hook members 3111 in the horizontal direction formed at the top of the pressing member assembly 3 is greater than a diameter of the central hole of the object 200.

Figure 3D:
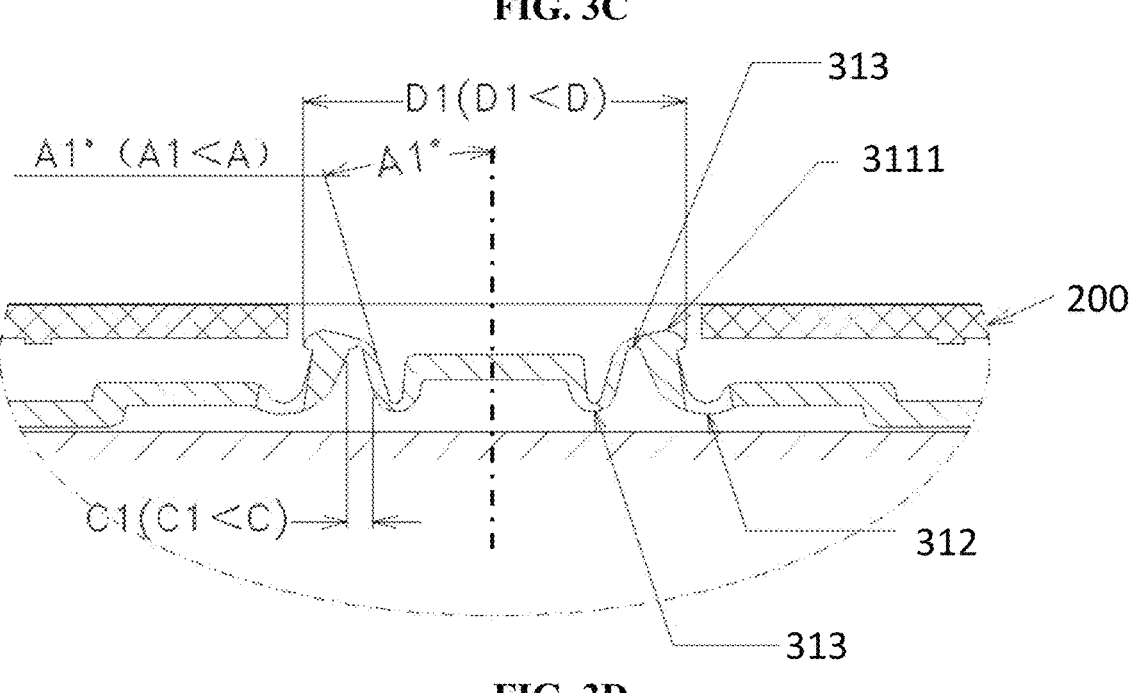
FIG. 3D is an enlarged view of portion V1 in FIG. 3B, which shows the state when the structure for locking and releasing the sheet-like object is pressed according to embodiments of the present application.
Figure 3E:
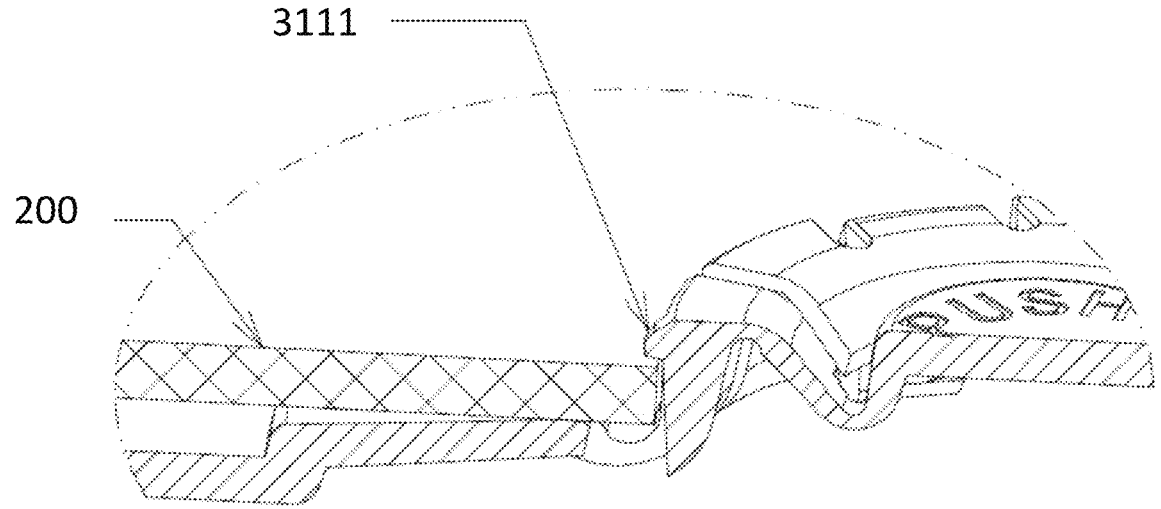
FIG. 3E is a schematic view showing a positional relation between the object and the snap fasteners when the pressing member assembly of the structure for locking and releasing the sheet-like object is not pressed according to embodiments of the present application.

As shown in FIG. 3D, in a case that the pressing sheet 34 moves downward toward the bottom of the accommodating portion 2 under a downward force, the pressing sheet 34 rotates relative to the second connecting portion 313 at the flexible connection with the second connecting portion 313, so that the inclination angle between the pressing sheet 34 and the second connecting portion 313 becomes A1°, where A1°<A°. In addition, the projection length of the second connecting portion 313 on the horizontal plane is C1, and C1<C, thereby driving the second connecting portion 313 to move downward. Since the second connecting portion 313 moves downward and rotates relative to the snap tooth 311 at the flexible connection with the snap tooth 311 so as to pull the snap tooth 311 downward, the snap tooth 311 rotates downward relative to the first connecting portion 312 at the flexible connection with the first connecting portion 312, so that the hook members 3111 of the snap teeth 311 rotates upward, and the maximum radial distance among hook members 3111 in the horizontal direction formed at the top of the pressing member assembly 3 becomes D1, and D1 is less than D and is further less than the diameter of the central hole of the object 200.

In a case that the downward force on the pressing sheet 34 is released, the inclination angle between the pressing sheet 34 and the second connecting portion 313 is restored to A°, and the projection length of the second connecting portion 313 on the horizontal plane is restored to C, so that the pressing sheet 34 automatically moves upward and is restored to an initial position so as to drive the hook members 3111 to be restored to the initial horizontal positions, and the maximum radial distance in the horizontal direction formed at the top of the pressing member assembly 3 is restored to D, which is greater than the diameter of the central hole of the object 200.

Further, according to an embodiment of the present application, particularly referring to FIGS. 2B to 2C and 4B to 4E, each push sheet 32 includes: an upper push portion 321, a support and a push sheet connecting portion 323. The upper push portion 321 is horizontally arranged and is lower than a horizontal position of the pressing sheet 34, and an upper push portion free end 3211, which protrudes for pushing the object 200 upward, is provided at a radial distal end of the upper push portion 321. The support 322 is substantially vertically arranged, and a lower portion of the support 322 is flexibly connected to the upper push portion 321, a lowest end of the support 322 is arranged to abut against an upper surface of the accommodating portion 2. At this time, as shown in FIG. 4G, a minimum distance between the object 200 and the bottom BT of the pressing member assembly is H1.

In addition, an uppermost end of the support 322 is flexibly connected to one end of the push sheet connecting portion 323, and another end of the push sheet connecting portion 323 is flexibly connected to the pressing sheet 34. Therefore, the upper push portion 321, the support 322, the push sheet connecting portion 323 and the pressing sheet 34 are rotatable relative to each other at the flexible connections. A maximum radial distance among the upper push portion free ends 3211 in the horizontal direction is greater than the diameter of the central hole of the object 200. In case that not force is applied, horizontal positions of the upper push portion free ends 3211 are lower than the horizontal positions of the hook members 3111, and a vertical height difference therebetween is at least equal to a thickness of the object 200.

Figure 2C:
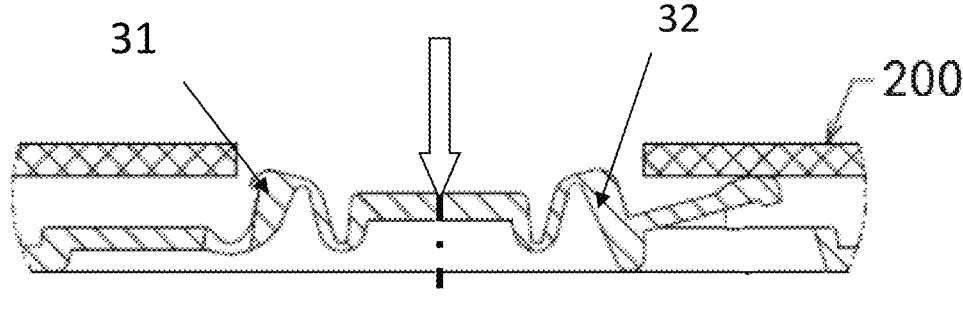
FIG. 2C is a state view of the structure for locking and releasing the sheet-like object in a pressed state according to embodiments of the present application.
Figure 4D:
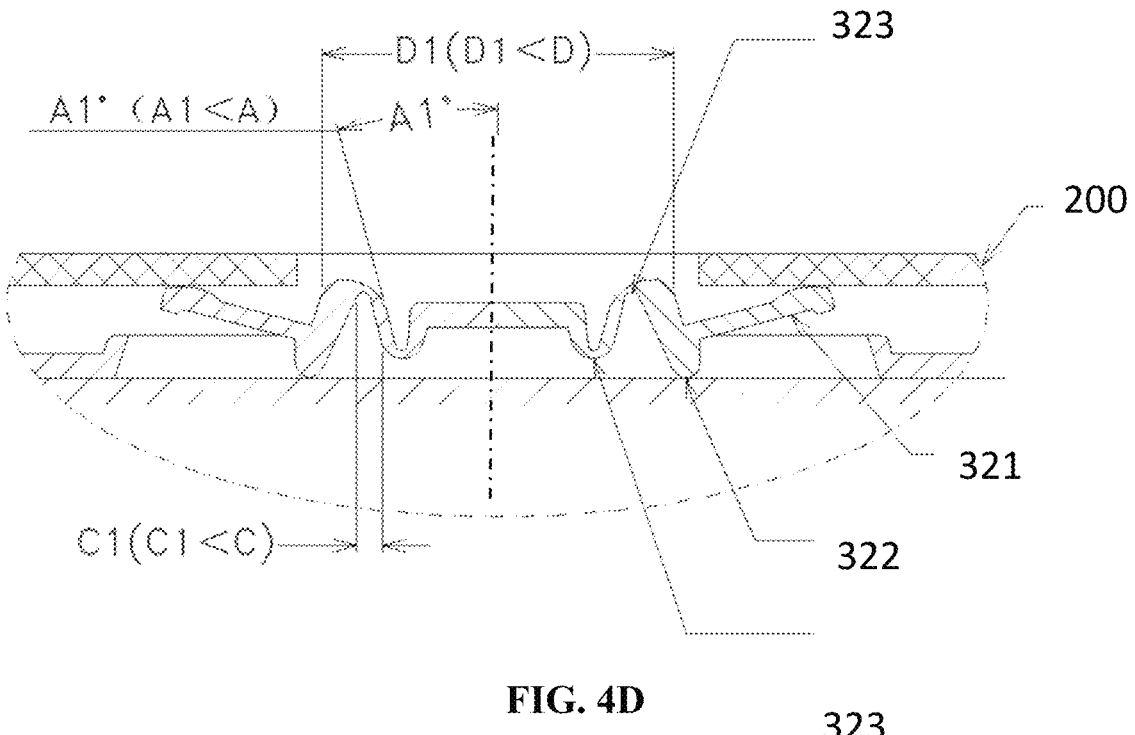
FIG. 4D is an enlarged view of portion V3 in FIG. 4B, which shows the state when the structure for locking and releasing the sheet-like object is pressed according to embodiments of the present application.
Figure 4E:
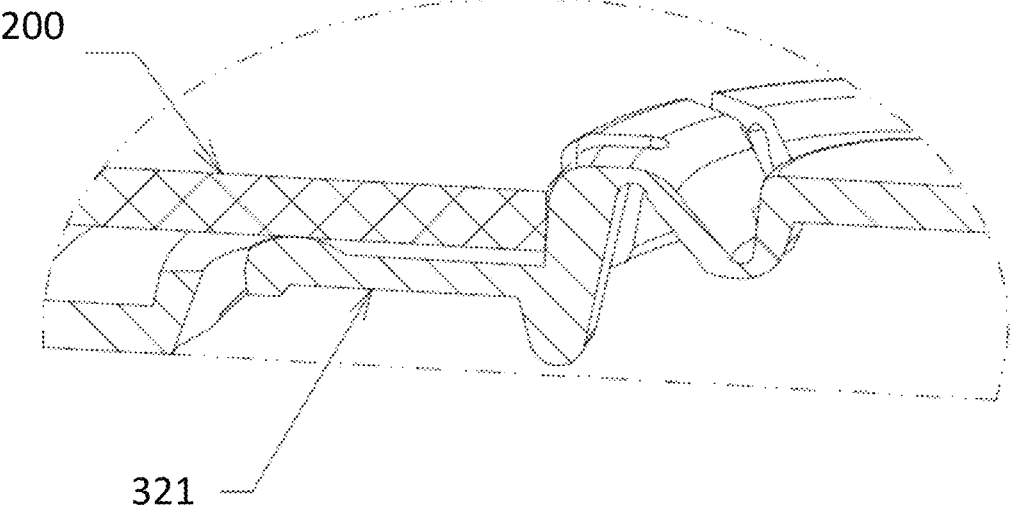
FIG. 4E is a schematic view showing an interaction relation between the object and the push sheet when the structure for locking and releasing the sheet-like object is not pressed according to embodiments of the present application.
Figure 4F:
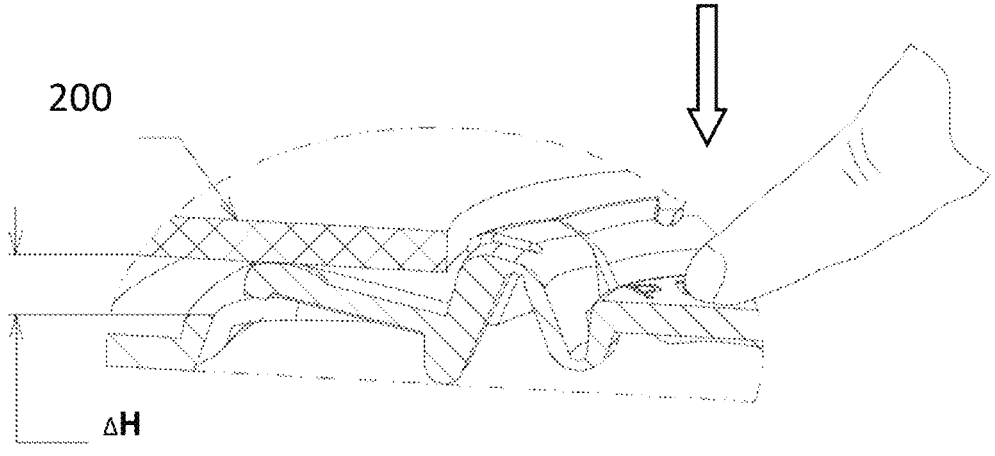
FIG. 4F is a schematic view showing an interaction relation between the object and the push sheet when the structure for locking and releasing the sheet-like object is pressed according to embodiments of the present application.
Figure 4G:
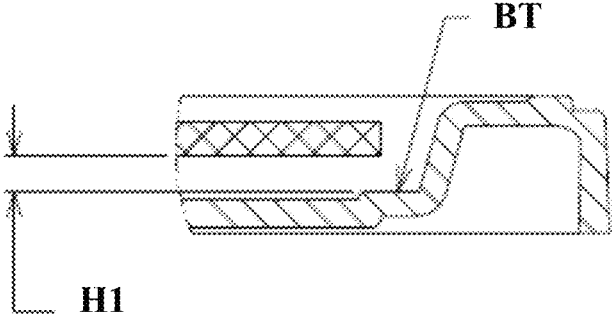
FIG. 4G is an enlarged view of portion V2 in FIG. 4B, which shows the state when the object is accommodated in the packaging storage container according to embodiments of the present application.
Figure 4H:
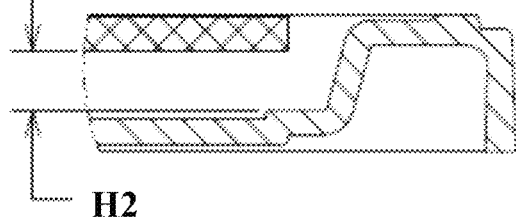
FIG. 4H is an enlarged view of portion V2 in FIG. 4B, which shows the state when the object is taken out from the packaging storage container according to embodiments of the present application.

According to the above structure, referring to FIGS. 2C and 4D, in a case that the pressing sheet 34 moves downward toward the bottom of the accommodating portion 2 under a downward force, the pressing sheet 34 rotates relative to the push sheet connecting portion 323 at the flexible connection with the push sheet connecting portion 323, so that an inclination angle between the pressing sheet 34 and the push sheet connecting portion 323 becomes less, to further drive the push sheet connecting portion 323 to move downward. Since the second connecting portion 313 moves downward and the lowest end of the support 322 abuts against the upper surface of the accommodating portion 2, a lever action is formed, so that the upper push portion free end 3211 at a radial distal end of the upper push portion 321 pivots upward around the lowest end of the support 322. At this time, as shown in FIG. 4F, a height of the object rises by H2 under the upward pushing effect of the upper top free ends 3211, so that the minimum distance between the object 200 and the bottom BT of the pressing member assembly is increased to H2. At this time, due to the increase in height, it is convenient for the user to take out the object from the accommodating portion 2.

In addition, referring to FIGS. 2C and 4D, in a case that the downward force on the pressing sheet 34 is released, the pressing sheet 34 automatically moves upward to be restored to the initial horizontal position, so as to drive the push sheets 32 to be restored to the initial horizontal positions. At this time, the upper push portion free end 3211 pivots downward around the lowest end of the support 322 to be restored to the initial horizontal position.

The operation of the pressing member assembly 3 according to the present disclosure is described in detail hereinafter.

When the object 200 needs to be placed in the accommodating portion 2 of the packaging storage container 2, the pressing sheet 34 of the pressing member assembly 3 is first pressed down. At this time, as described above, since the snap fasteners 32 of the pressing member assembly 3 are flexibly connected, the hook members 3111 of the snap teeth 311 rotate upward under force, so that the maximum radial distance among all the hook members 3111 in the horizontal direction formed at the top of the pressing member assembly 3 is reduced. At this time, since the upper push portion free ends 3211 are lower than the horizontal positions of the hook members 3111, the object 200 enters the accommodating portion without being hindered. When the object 200 is completely accommodated in the accommodating portion 2, the pressing sheet 34 is released. Due to the flexibility, the hook members 3111 are restored to the horizontal positions, the maximum radial distance among all the hook members 3111 in the horizontal direction formed at the top of the pressing member assembly 3 is restored to be greater than the diameter of the central hole of the object 200, so that the object 200 is stuck from the above to be maintained in the accommodating portion 2.

When the object 200 needs to be taken out from the accommodating portion 2, the pressing sheet 34 of the pressing member assembly 3 is first pressed down. At this time, as described above, since the snap fasteners 32 of the pressing member assembly 3 are flexibly connected, the hook members 3111 of the snap teeth 311 rotate upward under force, so that the maximum radial distance among all the hook members 3111 formed at the top of the pressing member assembly 3 is reduced. At this time, the support 322 of the push sheet 32 generates a lever effect under force. Since the push sheet connecting portion 323 moves downward, the upper push portion free end 322 of the upper push portion 321 pivots upwards, thereby pushing the object 200 upward in a direction of moving out of the accommodating portion 2. At this time, on one hand, the maximum radial distance among all the hook members 3111 formed at the top of the pressing member assembly 3 is reduced to be less than the diameter of the central hole of the object 200, which does not hinder the upward movement of the object 200. On the other hand, the upper push portion free end 322, under the leverage of the support 322, converts the downward force of pressing the pressing sheet 34 into the force of pushing the object 200 upward, so that the user can easily take out the object 200 from the accommodating portion 2.

The structure for locking and releasing the sheet-like object and the packaging storage container having the same according to the embodiments of the present disclosure can obtain the following technical effects.

1, when the object is placed in the accommodating portion, after the pressing sheet is pressed, the hook members of the pressing member assembly for holding are rotated upward, so that the horizontal radial distance above the pressing member assembly is less than the diameter of the central hole of the object, the object can be placed in the accommodating portion without being hindered, and the object may not be damaged by the collision of the packaging storage container during placement. At the same time, the hook members are automatically restored to the horizontal state after the pressing sheet is released, thereby firmly holding the object.

2, when the object is taken out from the accommodating portion, the hook members of the pressing member assembly rotate upward under force, so that the horizontal radial distance above the pressing member assembly is less than the diameter of the central hole of the object, and the object can be easily taken out without being damaged by the collision of the packaging storage container. In addition, since the pressing member assembly according to the present disclosure is further provided with the push sheets, which can generate a lever effect to change the downward force of pressing the pressing member into the force of pushing the object upward, so that the user can easily and effortlessly take out the object from the accommodating portion.

3, the pressing member assembly according to the present disclosure is integrally formed with a simple structure and a small space occupation, and the user can put in and take out the object only by pressing the pressing member, so that the operation is simple.

4, during pressing, the snap fasteners according to the present disclosure are prevented from directly contacting the object, so that the object can be prevented from being damaged.

Finally, it should be stated that: the above embodiments are only intended for illustrating the technical solutions of the present disclosure rather than limiting the present application. Although the present disclosure is illustrated in detail with reference to the embodiments described above, it should be understood by those skilled in the art that, modifications can still be made to the technical solutions recited in the embodiments described above, or equivalent substitutions can be made onto a part or all of the technical features of the technical solution. While such modifications or substitutions will not cause the essence of corresponding technical solutions to depart from the scope of the technical solutions of the embodiments of the present application.

The invention claimed is:

1. A structure for locking and releasing a sheet-like object, comprising:

an accommodating portion; for accommodating the object; and a pressing member assembly, arranged at a center of the accommodating portion, and protruding upward from a bottom of the accommodating portion to pass through a central hole of the object and hold the object in the accommodating portion, wherein the pressing member assembly comprises: a plurality of snap fasteners for fixing the object; a plurality of push sheets for pushing the object; a pressing member body; and a pressing sheet; the pressing sheet is formed at a top center of the pressing member assembly and is in a flat-plate shape for a user to press downward; the snap fasteners and the push sheets are respectively flexibly connected with the pressing member body and the pressing sheet, so that the snap fasteners and the push sheets are rotatable when the pressing sheet is moved up and down, and wherein the snap fasteners and the push sheets extend radially between the pressing member body and the pressing sheet, wherein a radial distal end of each snap fastener is flexibly connected to the pressing member body or is integrally formed with the pressing member body, and a radial proximal end of each snap fastener is connected to the pressing sheet; wherein a radial proximal end of each push sheet is connected to the pressing sheet, wherein each snap fastener comprises: a snap tooth, a first connecting portion and a second connecting portion; the snap tooth is vertically arranged and is provided with a hook member which protrudes outward radially, the snap tooth is flexibly connected with the pressing member body and the pressing sheet through the first connecting portion and the second connecting portion, and the soap tooth is rotatable relative to the first connecting portion and the second connecting portion at flexible connections with the first connecting portion and the second connecting portion, and the second connecting portion is rotatable relative to the pressing sheet at a flexible connection with the pressing sheet, wherein the hook members is arranged in a horizontal direction when the pressing sheet is un-pressed, and a maximum radial distance among the hook members in the horizontal direction formed at the top of the pressing member assembly is D, which is greater than a diameter of the central hole of the object, a projection length of the second connecting portion on a horizontal plane is C, and an inclination angle $A°$ is formed between the second connecting portion and the pressing sheet when the pressing sheet is on-pressed, wherein, when the pressing sheet moves downward toward the bottom of the accommodating portion under a downward force, the pressing sheet can rotate relative to the second connecting portion at the flexible connection with the second connecting portion, so that the inclination angle becomes $A1°$, and $A1°<A°$, the projection length of the second connecting portion on the horizontal plane is $C1$, and $C1<C$, so that the second connecting portion is driven to move downward and rotates relative to the snap tooth at a flexible connection with the snap tooth to pull the snap tooth downward, and the snap tooth rotates downward relative to the first connecting portion at the flexible connection with the first connecting portion, so that the hook members of the snap teeth rotates upward, the maximum radial distance becomes $D1$ from $D$, and $D1$ is less than $D$ and is less than the diameter of the central hole of the object, wherein, when the downward force on the pressing sheet is released, the inclination angle is restored to $A°$, and the projection length of the second connecting portion on the horizontal plane is restored to $C$, so that the pressing sheet moves upward and is restored to an initial position so as to drive the hook members to be restored to initial horizontal positions, and the maximum radial distance is restored to $D$, wherein each push sheet comprises: an upper push portion, a support and an push sheet connecting portion, the upper push portion is horizontally arranged and is lower than a horizontal position of the pressing sheet, a radial distal end of the upper push portion is an upper push portion free end and protrudes upward for pushing the object upward, the support is vertically arranged, and a lower portion of the support is flexibly connected to a radial proximal end of the upper push portion, a lowest end of the support is arranged to abut against an upper surface of the accommodating portion, an uppermost end of the support is flexibly connected to one end of the push sheet connecting portion, and another end of the push sheet connecting portion is flexibly connected to the pressing sheet, wherein a maximum radial distance between the upper push portion free ends of the plurality of push sheets in the horizontal direction is greater than the diameter of the central hole of the object, horizontal positions of the upper push portion free ends of the plurality of push sheets are arranged lower than the horizontal positions of the hook members when no force is applied, and a vertical height difference between the upper push portion free ends and the hook members is at least equal to a thickness of the object, wherein, when the pressing sheet moves downward toward the bottom of the accommodating portion under a downward force, the pressing sheet rotates relative to the push sheet connecting portion at the flexible connection with the push sheet connecting portion, an inclination angle between the pressing sheets and the push sheet connecting portion becomes less, so that the push sheet connecting portion is further driven to move downward and the lowest end of the support is arranged to abut against an upper surface of the accommodating portion, and the upper push portion free ends pivot upward around the lowest end of the support and push the object to move upward, and wherein, when the downward force on the pressing sheet is released, the pressing sheet moves upward and is restored to the initial position so as to drive the hook members to be restored to the initial horizontal positions, and thus the upper push portion free ends pivot downward around the lowest end of the support to be restored to the initial horizontal positions.

2. The structure for locking and releasing the sheet-like object according to claim 1, wherein the pressing member assembly is made of materials selecting from: ABS; polystyrene ethylene; polycarbonate; PP; and PE.

3. The structure for locking and releasing the sheet-like object according to claim 1, wherein the pressing member body is fixedly connected to the accommodating portion or is integrally formed with the accommodating portion.

4. The structure for locking and releasing the sheet-like object according to claim 1, wherein a plurality of edge recesses are spaced apart at equal circumferential angles at a circumferential edge of the accommodating portion for the object to be taken out from the accommodating portion.

5. A packaging storage container, for accommodating a sheet-like object, comprising:

a container body, with a thickness;

the structure for locking and releasing the sheet-like object according to claim 1; and a cover body, pivotally connected to the container body on one side of the container body to close or uncover the accommodating portion, wherein the accommodating portion is circular and arranged at the center of the container body, and the accommodating portion is recessed from one side surface of the container body along a thickness direction of the container body.

* * * * *